United States Patent
Abe et al.

(10) Patent No.: US 11,645,477 B2
(45) Date of Patent: May 9, 2023

(54) RESPONSE SENTENCE CREATION DEVICE

(71) Applicant: NTT DOCOMO, INC., Chiyoda-ku (JP)

(72) Inventors: Noriyuki Abe, Chiyoda-ku (JP); Kanako Oonishi, Chiyoda-ku (JP)

(73) Assignee: NTT DOCOMO, INC., Chiyoda-ku (JP)

( * ) Notice: Subject to any disclaimer, the term of this patent is extended or adjusted under 35 U.S.C. 154(b) by 226 days.

(21) Appl. No.: 17/267,995

(22) PCT Filed: Jul. 10, 2019

(86) PCT No.: PCT/JP2019/027402
§ 371 (c)(1),
(2) Date: Feb. 11, 2021

(87) PCT Pub. No.: WO2020/054201
PCT Pub. Date: Mar. 19, 2020

(65) Prior Publication Data
US 2021/0165972 A1 Jun. 3, 2021

(30) Foreign Application Priority Data
Sep. 11, 2018 (JP) .............................. JP2018-169763

(51) Int. Cl.
*G06F 40/56* (2020.01)
*G06F 16/9032* (2019.01)
*G10L 15/22* (2006.01)

(52) U.S. Cl.
CPC ........ *G06F 40/56* (2020.01); *G06F 16/90332* (2019.01); *G10L 15/22* (2013.01)

(58) Field of Classification Search
CPC ..... G06F 16/90332; G06F 40/56; G10L 15/22
See application file for complete search history.

(56) References Cited

U.S. PATENT DOCUMENTS 6,324,539 B1 * 11/2001 Gebauer ............... G06F 16/972
9,064,013 B1 * 6/2015 Gay ........................ H04L 9/40
(Continued)

FOREIGN PATENT DOCUMENTS

| JP | 2007-249907 A | 9/2007 |
| JP | 2011-76627 A | 4/2011 |
| JP | 2013-111178 A | 6/2013 |

OTHER PUBLICATIONS

International Search Report dated Oct. 1, 2019 in PCT/JP2019/027402 filed Jul. 10, 2019, 1 page.
(Continued)

*Primary Examiner* — Eric Yen
(74) *Attorney, Agent, or Firm* — Oblon, McClelland, Maier & Neustadt, L.L.P.

(57) ABSTRACT

A response sentence creation device includes an acquisition unit configured to acquire information indicating a situation and trigger information serving as a trigger of start of response sentence creation, a first query creation unit configured to create a first query for deriving the first answer on the basis of the trigger information, a first answer derivation unit configured to derive a first answer to the first query on the basis of the information indicating the situation, a second query creation unit configured to creates a second query for deriving a second answer on the basis of the first answer, a second answer derivation unit configured to derive the second answer to the second query on the basis of the information indicating the situation, and a response sentence creation unit configured to combine the first answer with the second answer to create a response sentence.

7 Claims, 6 Drawing Sheets

(56) References Cited

U.S. PATENT DOCUMENTS

| | | | | |
|---|---|---|---|---|
| 9,471,668 | B1* | 10/2016 | Alupului | G06F 16/3329 |
| 10,360,265 | B1* | 7/2019 | Agarwal | G10L 15/1815 |
| 2002/0129348 | A1* | 9/2002 | Kerpan | G06F 16/289 |
| | | | | 717/170 |
| 2006/0026122 | A1* | 2/2006 | Hurwood | G06F 16/838 |
| | | | | 715/255 |
| 2011/0105190 | A1* | 5/2011 | Cha | G06F 40/274 |
| | | | | 704/235 |
| 2012/0130934 | A1* | 5/2012 | Brillhart | G06F 16/24578 |
| | | | | 706/46 |
| 2013/0262501 | A1* | 10/2013 | Kuchmann-Beauger | |
| | | | | G06F 16/24535 |
| | | | | 707/769 |
| 2015/0026169 | A1* | 1/2015 | Brown | G06F 16/24578 |
| | | | | 707/723 |
| 2015/0261849 | A1* | 9/2015 | Chu-Carroll | G06F 40/289 |
| | | | | 707/723 |
| 2016/0006682 | A1* | 1/2016 | Bastide | G06F 16/24578 |
| | | | | 709/206 |
| 2016/0171119 | A1* | 6/2016 | Bufe | H04L 67/535 |
| | | | | 715/746 |
| 2016/0357806 | A1* | 12/2016 | Andleman | G06F 16/273 |
| 2019/0073598 | A1* | 3/2019 | Giovannini | G06F 16/2471 |
| 2019/0244608 | A1* | 8/2019 | Choi | G10L 15/08 |
| 2020/0005784 | A1* | 1/2020 | Vadackupurath Mani | |
| | | | | G06N 3/088 |
| 2021/0027759 | A1* | 1/2021 | Ogawa | G16H 20/60 |

OTHER PUBLICATIONS

Notice of Reasons for Refusal dated Jan. 18, 2022 in Japanese Patent Application No. 2020-546721 (with English language translation), 6 pages.

International Preliminary Report on Patentability and Written Opinion dated Mar. 25, 2021 in PCT/JP2019/027402 (submitting English translation only), 6 pages.

* cited by examiner

| player | shoot | goal | starting | throughpass | assist | time |
|--------|-------|------|----------|-------------|--------|------|
| A | 8 | 3 | true | 0 | 0 | present |
| A | 7 | 2 | true | 0 | 0 | past |

| player | shoot | goal | starting | throughpass | assist | time |
|--------|-------|------|----------|-------------|--------|---------|
| A | 1 | 0 | true | 0 | 0 | present |
| A | 2 | 0 | false | 0 | 0 | past |

(b)

123

| player | shoot | goal | starting | throughpass | assist | time |
|--------|-------|------|----------|-------------|--------|---------|
| A | 1 | 0 | true | 0 | 0 | present |
| A | 4 | 1 | true | 0 | 0 | past |

(c)

124

| player | shoot | goal | starting | throughpass | assist | time |
|--------|-------|------|----------|-------------|--------|---------|
| A | 6 | 0 | true | 0 | 0 | present |
| A | 5 | 2 | true | 0 | 0 | past |

(d)

125

| player | shoot | goal | starting | throughpass | assist | time |
|--------|-------|------|----------|-------------|--------|---------|
| A | 3 | 0 | true | 2 | 1 | present |
| A | 3 | 1 | true | 2 | 3 | past |

RESPONSE SENTENCE CREATION DEVICE

TECHNICAL FIELD

One aspect of the present invention relates to a response sentence creation device.

BACKGROUND ART

A system that performs a dialogue with a user and creates a response sentence depending on a situation on the basis of a user's question or the like is known (see, for example, Patent Literature 1). In the system described in Patent Literature 1, a dialogue scenario regarding information requested by the user is selected from a database, and a response sentence for the requested information is created on the basis of the selected dialogue scenario. Such a dialogue system is expected to be used in various fields, and in particular, realization of a dialogue system that responds to a situation that changes in real time as in sports is expected.

CITATION LIST

Patent Literature

[Patent Literature 1] Japanese Unexamined Patent Publication No. 2011-76627

SUMMARY OF INVENTION

Technical Problem

In a system such as that described above, since the response sentence is created on the basis of the dialogue scenario (fixed phrase) prepared in advance, the response sentence tends to be monotonous, and a response sentence requested by the user cannot be provided in some cases. In particular, it is difficult to provide a flexible response sentence on the basis of advance information or information that changes in real time. In order to provide a flexible response sentence, it is necessary to prepare a large number of dialogue scenarios (fixed phrases) assuming all situations, but this causes a problem of increasing costs.

One aspect of the present invention has been made in view of the above circumstances, and an object of the present invention is to create an appropriate response sentence depending on various situations while curbing costs.

Solution to Problem

A response sentence creation device according to an aspect of the present invention is a response sentence creation device for creating a query depending on a situation and creating a response sentence for the query, the response sentence creation device including an acquisition unit configured to acquire information indicating a situation and trigger information serving as a trigger of start of response sentence creation; a first query creation unit configured to create a first query for deriving a first answer on the basis of the trigger information; a first answer derivation unit configured to derive a first answer to the first query on the basis of the information indicating the situation; a second query creation unit configured to creates a second query for deriving a second answer on the basis of the first answer; a second answer derivation unit configured to derive the second answer to the second query on the basis of the information indicating the situation; and a response sentence creation unit configured to combine the first answer with the second answer to create a response sentence.

In the response sentence creation device according to the aspect of the present invention, the first answer to the first query and the second answer to the second query are derived on the basis of the acquired information indicating the situation and combined for creation of the response sentence. Thus, the first answer and the second answer are created depending on the situation and are combined for creation of the response sentence, such that a more appropriate response sentence (non-monotonous response sentence) depending on the situation can be created as compared with a case in which a response sentence is created from a dialogue scenario (fixed phrase) prepared in advance, for example. Further, in the response sentence creation device according to the aspect of the present invention, the second query for deriving the second answer is created on the basis of the first answer to the first query. Accordingly, a new query (second query) is dynamically created according to the answer (first answer) derived in consideration of the situation, an answer (second answer) is derived, and a response sentence is created from the first answer and the second answer. Thus, a new query is created from the answer derived in consideration of the situation and an additional answer is derived and thus, a response sentences obtained from these answers become more appropriate for the situation. As described above, when the answers can be acquired from the respective queries, the response sentence can be easily created simply by combining these answers and thus, for example, it is possible to greatly reduce a cost as compared with a case in which a large number of dialogue scenarios (fixed phrases) are prepared. From the above, with the response sentence creation device according to the aspect of the present invention, it is possible to create an appropriate response sentence depending on various situations while curbing costs.

The acquisition unit may acquire information indicating the present situation as the information indicating the situation. This makes it possible to create a response sentence in consideration of the present situation, and to flexibly create a response sentence for a situation that changes in real time.

The acquisition unit may further acquire information indicating a past situation as the information indicating the situation. This makes it possible to create a response sentence in consideration of not only the present situation but also the past situation, and to create a more appropriate response sentence depending on the situation.

The acquisition unit may acquire both information indicating a present situation and information indicating a past situation as the information indicating the situation. The first query creation unit may create the first query for deriving the first answer related to the present situation on the basis of the trigger information. The first answer derivation unit may derive the first answer to the first query on the basis of the information indicating the present situation. The second query creation unit may create the second query for deriving the second answer related to the past situation on the basis of the first answer. The second answer derivation unit may derive the second answer to the second query on the basis of the information indicating the past situation. Accordingly, the first answer is derived and the second query related to the first answer is created on the basis of the present situation, and the second answer to the second query is derived on the basis of the past situation. Thus, an answer based on the present situation (first answer) and an answer based on the past situation (second answer) are obtained for related content such that a further appropriate response sentence depending on the situation can be created.

The acquisition unit may acquire the trigger information from a user's utterance. This makes it possible to more preferably create the response sentence requested by the user.

The acquisition unit acquires the trigger information from the information indicating the situation. This makes it possible to create a response sentence depending on the situation even when there is no input (utterance or the like) from the user.

Advantageous Effects of Invention

According to an aspect of the present invention, it is possible to create an appropriate response sentence depending on various situations while curbing costs.

DESCRIPTION OF EMBODIMENTS

Hereinafter, embodiments of the present invention will be described in detail with reference to the accompanying drawings. In description of the drawings, the same reference signs are used for the same or equivalent elements, and duplicate description will be omitted.

Figure 1:
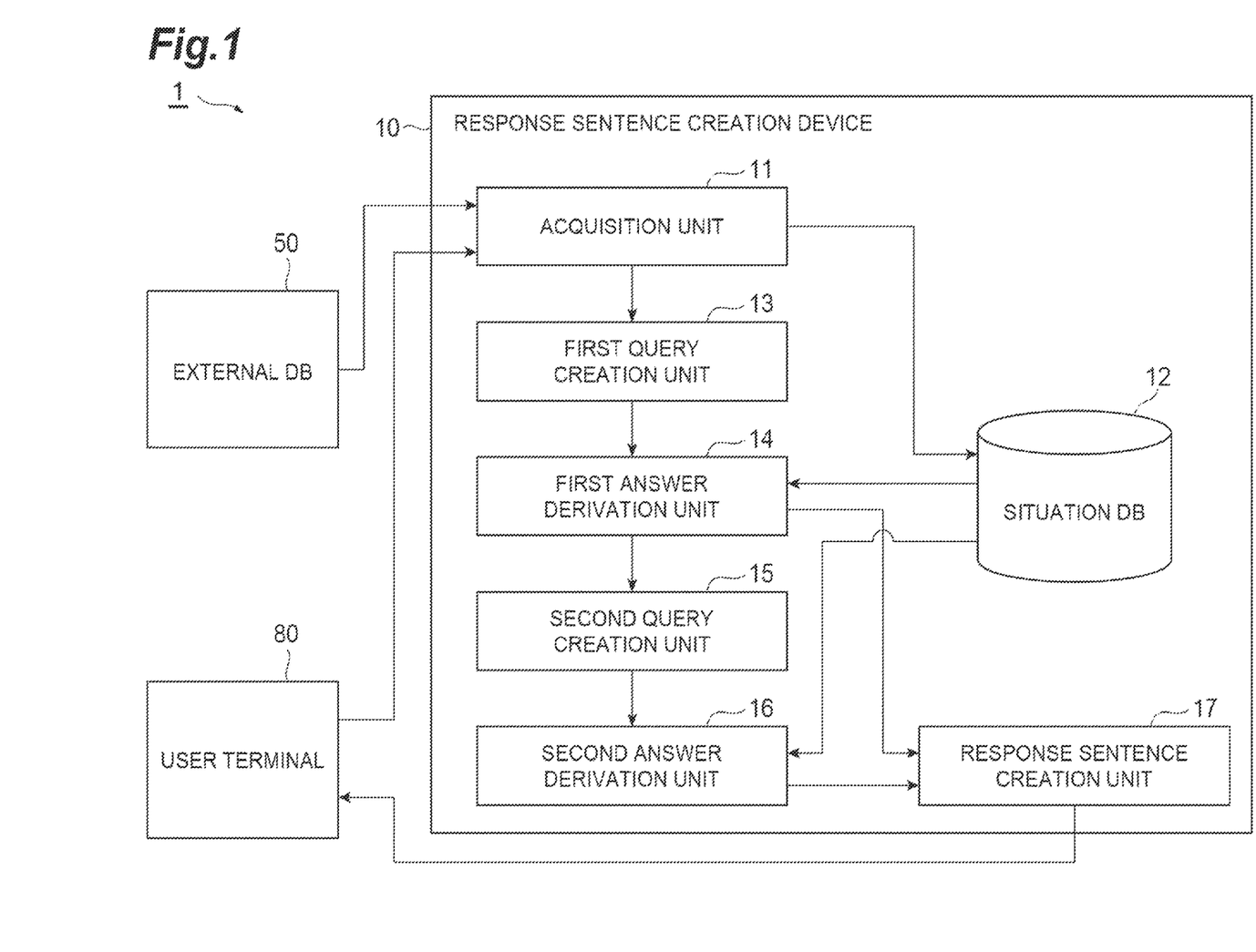
FIG. 1 is a diagram schematically illustrating a dialogue system according to an embodiment, and is a diagram illustrating a function of a response sentence creation device included in the dialogue system.

FIG. 1 is a diagram schematically illustrating a dialogue system 1 according to the present embodiment, and is a diagram illustrating functions of a response sentence creation device 10 included in the dialogue system 1. As illustrated in FIG. 1, the dialogue system 1 includes a response sentence creation device 10, an external DB 50, and a user terminal 80. Although only one user terminal 80 is illustrated in FIG. 1, the dialogue system 1 may actually include a plurality of user terminals 80. The dialogue system 1 is a system in which dialogue (communication) is performed between the user terminal 80 and the response sentence creation device 10, such that information requested by the user terminal 80 is provided by the response sentence creation device 10 (a response sentence is provided). In the present embodiment, the dialogue system 1 will be described as being applied to creation of a response sentence regarding a soccer match in which a situation changes in real time. The field to which the dialogue system 1 is applied is not limited thereto, and may be applied to, for example, creation of a response sentence regarding other sports in which a situation changes in real time, or creation of a response sentence in fields other than sports.

The external DB 50 is a database that stores various types of information on the soccer match outside the response sentence creation device 10. The various types of information on the soccer match includes, for example, information on a soccer match played in the past and information on a soccer match being played (currently) in real time. The various types of information on the soccer match includes not only information on a result of the match but also information on a record of each player (the number of goals, the number of shoots, whether or not a player is a starting lineup, and the like).

The user terminal 80 is a communicable terminal such as a smartphone, a tablet terminal, or a PC. The user terminal 80, for example, is configured to be able to acquire the information on the soccer match in real time from video distribution or SNS information. The user terminal 80 is configured so that the user can speak. The user terminal 80 transmits utterance content (content regarding the soccer match) of the user to the response sentence creation device 10 as trigger information that will be described below. In the present embodiment, an example in which content transmitted from the user terminal 80 to the response sentence creation device 10 is acquired from the utterance will be described, but the present invention is not limited thereto and, for example, content input by the user on the user terminal 80 may be transmitted to the response sentence creation device 10.

The response sentence creation device 10 is a response sentence creation device that creates a query depending on a situation and creates a response sentence for the query. As illustrated in FIG. 1, the response sentence creation device 10 includes an acquisition unit 11, a situation DB 12, a first query creation unit 13, a first answer derivation unit 14, a second query creation unit 15, a second answer derivation unit 16, and a response sentence creation unit 17.

The acquisition unit 11 acquires information indicating a situation of the soccer match (information indicating the situation). The acquisition unit 11 acquires the information indicating the situation above described from the external DB 50. The acquisition unit 11 may acquire the information indicating the situation at predetermined time intervals, for example, and may acquire only information newly added to the external DB 50 each time. The acquisition unit 11 acquires both the information indicating the past situation (information on the soccer match that has already ended) and the information indicating the present situation (information on a soccer match being played in real time) as the information indicating the situation. The acquisition unit 11 stores the acquired information indicating the situation in the situation DB 12. The acquisition unit 11 at least adds information capable of specifying whether the information indicating the situation is the information indicating the past situation or the information indicating the present situation, and stores the information in the situation DB 12.

The acquisition unit 11 acquires the user's utterance content, which is the trigger information, from the user terminal 80. That is, the acquisition unit 11 acquires the trigger information from the user's utterance. The trigger information is information serving as a trigger of start of response sentence creation in the response sentence creation device 10. The acquisition unit 11 analyzes the utterance content using a conventionally well-known method, and specifies content transmitted by the user (for example, question content depending on a situation of the soccer match, such as "How about player A recently?"). The acquisition unit 11 outputs the trigger information after the analysis and specifying to the first query creation unit 13.

Figure 2:
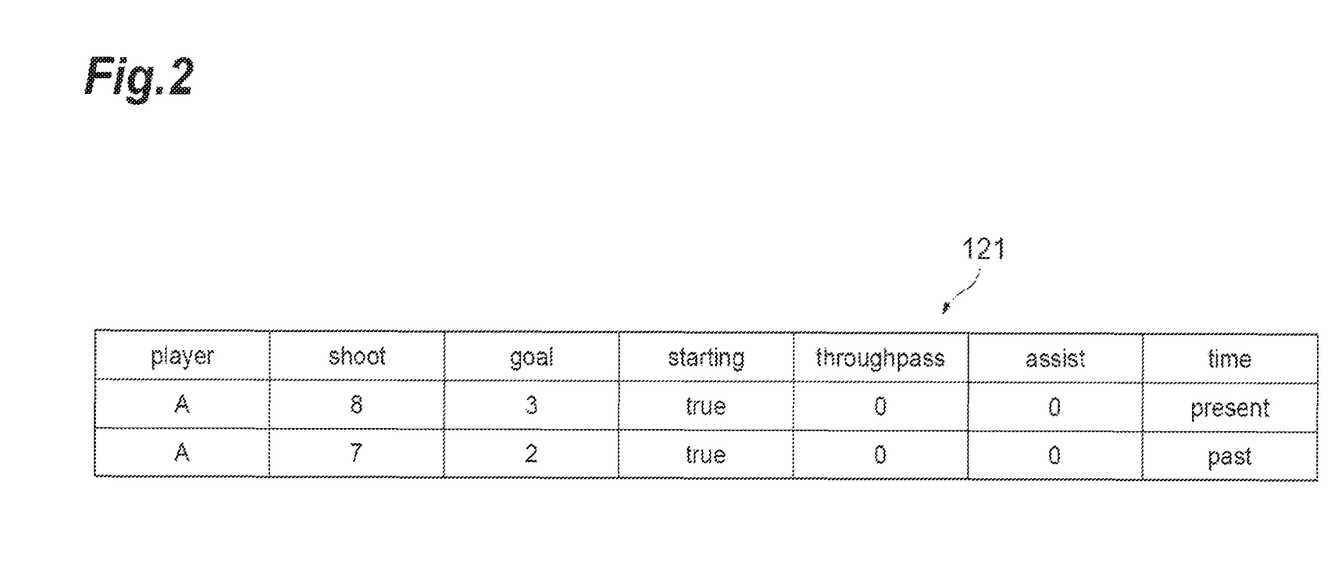
FIG. 2 is a diagram illustrating a configuration example of situation data.

The situation DB 12 is a database that stores information indicating a situation stored by the acquisition unit 11 as situation data. FIG. 2 is a diagram illustrating a configuration example of the situation data. In an example of situation data 121 illustrated in FIG. 2, a record is associated with each match for a certain player (player A). Specifically, the number of shoots (shoot) of player A, the number of goals (goal) of player A, whether or not player A is a starting member (starting), the number of through-passes (through-pass) of player A, the number of assists (assist) of player A, and information (time) indicating whether or not a match is currently in progress are associated with each match. For whether or not player A is a starting member, "true" is set when player A is a starting member, and "false" is set when player A is not a starting member. Further, for the information indicating whether or not the match is currently in progress, "present" is set when the match is currently in progress, and "past" is set when the match is not currently in progress (past match). In the information (time) indicating whether or not the match is currently in progress, not only "past" is set for a past match, but also a time when a match is played (for example, a match before a certain match) may be set. For example, in the example of the situation data 121 supported in FIG. 2, a situation of a match currently being played by player A is defined in an upper part, and it is shown that the number of shoots is 8, the number of goals is 3, player A is a starting member, a through-pass is 0, and an assist is 0. Further, a lower part of the situation data 121 defines a situation of a certain match of player A in the past, and it is shown that, in the match, the number of shoots is 7, the number of goals is 2, player A is a starting member, the through-pass is 0, and the assist is 0.

The first query creation unit 13 creates a first query for deriving the first answer on the basis of the trigger information. The first query creation unit 13 outputs the created first query to the first answer derivation unit 14. The first query creation unit 13 receives, for example, an input of the trigger information from the acquisition unit 11, and creates the first query depending on words indicated in the trigger information. The first query creation unit 13 first determines an evaluation index depending on the words indicated in the trigger information. A method of determining the evaluation index differs between a case in which the trigger information includes words related to a predetermined action or a case in which the trigger information does not include the words related to the predetermined action. Examples of the words related to the predetermined action include a shoot, a goal, a through-pass, and an assist. Further, in any case, the first query creation unit 13 determines whether or not the trigger information includes a predetermined proper noun. The predetermined proper noun is, for example, a player name, a team name, or the like. In the following description, it is assumed that the trigger information includes a predetermined proper noun in principle. The first query creation unit 13 may specify words other than the words regarding the action and the predetermined proper nouns, such as words having content representing a date and time such as "recent" and "previous".

When the trigger information includes the words related to the predetermined action, the first query creation unit 13 adopts an evaluation index regarding the action and creates a query regarding the action. For example, when "shoot" is extracted as the word related to the action, the number of goals (a decision rate) with respect to the number of shoots may be used as the evaluation index. On the other hand, when the trigger information does not include the words related to the predetermined action, the first query creation unit 13 adopts an evaluation index having a predetermined content and creates a query having predetermined content. An example of the query having predetermined content includes a query for asking for a condition of a specified player or team (checking a degree of activity). In this case, the first query creation unit 13 creates a query for asking for the condition according to a position of the specified player. For example, it is assumed that words "How about player A recently'?" are indicated in the trigger information. In this case, the first query creation unit 13 specifies player A who is a player name and determines that the trigger information does not include the words related to the predetermined action (that is, a query for asking for the condition of player A is created). Now, assuming that player A is FW, the first query creation unit 13 creates a query for asking for the condition of player A, such as a query (Query (player=A, goal=?, time=present)) for asking for the number of goals of player A. Using the number of goals as an evaluation index is an example and, for example, when player A is a goalkeeper, the number of goals conceded by player A may be used as the evaluation index. When the trigger information does not include the words related to the predetermined action, the first query creation unit 13 may not only simply creates a query for asking for the condition, but also create a query for asking for more detailed content depending on words included in the trigger information.

The first query creation unit 13 may create a first query for deriving the first answer related to the present situation on the basis of the trigger information. For example, for the trigger information including the words "How is player A recently?", the first query creation unit 13 creates a query for asking for a condition (number of goals) of player A for an ongoing match. In this case, the second query creation unit 15, which will be described below, create, for example, a second query for deriving a second answer related to the past situation (details will be described below). Accordingly, a response sentence taking the present and past situations into account are created from the first answer and the second answer. Hereinafter, an example in which the first query creation unit 13 creates the first query for deriving the first answer related to the present situation, and the second query creation unit 15 creates the second query for deriving the second answer related to the past situation will be described.

The first answer derivation unit 14 derives the first answer to the first query on the basis of the information indicating the situation. More specifically, the first answer derivation unit 14 derives the first answer to the first query on the basis of the information indicating the present situation. When the first answer derivation unit 14 receives the input of the first query from the first query creation unit 13, the first answer derivation unit 14 refers to the situation DB 12 and derives the first answer to the first query on the basis of situation data that is the information indicating the situation. Now, it is assumed that, for example, a query (Query (player=A, goal=?, time=present)) for asking for the number of goals of player A is input as a query for asking for the condition of player A from the first query creation unit 13. In this case, the first answer derivation unit 14 specifies the number of goals (three goals) of player A in an ongoing match on the basis of the situation data 121 illustrated in FIG. 2, for example, and derives a first answer "three goals have been scored". The first answer derivation unit 14 outputs the derived first answer to the second query creation unit 15 and the response sentence creation unit 17.

The second query creation unit 15 creates the second query for deriving the second answer on the basis of the first answer. More specifically, the second query creation unit 15 creates the second query for deriving the second answer related to the past situation on the basis of the first answer related to the present situation. When the second query creation unit 15 receives the input of the first answer from the first answer derivation unit 14, the second query creation unit 15 creates the second query related to the first answer. When the second query creation unit 15 receives the input of the first answer, the second query creation unit 15 determines, for example, whether the first answer is a good evaluation result or a bad evaluation result. For example, when the first answer is a good evaluation result, the second query creation unit 15 may create a query for asking for how it was with the same evaluation index in the past, or may create a query for asking for how it was with an evaluation index of a higher degree of activity than that in the past. For example, when it can be specified from the first answer that player A has scored a goal in a today's match, the second query creation unit 15 creates a query for asking for whether player A has scored a goal in the previous match as a query (Query (player=A, goal=?, time=past)) for asking for the number of goals in the previous match of player A. Further, the second query creation unit 15, for example, may create a query for asking for whether or not how it was with an evaluation index of a lower degree of activity than that in the past when the first answer is a bad evaluation result or may create a query for asking for how it was with the same evaluation index in the past.

Figure 3:
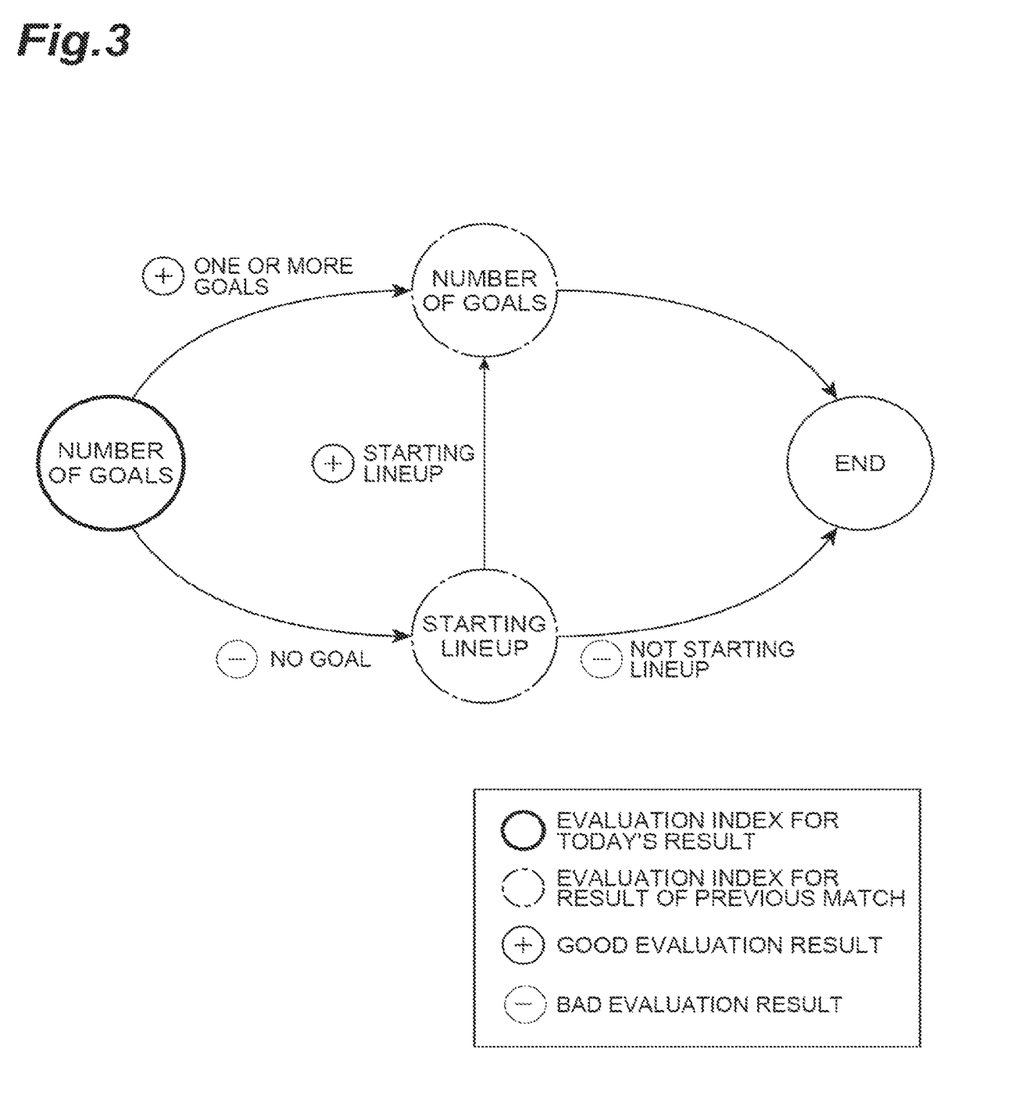
FIG. 3 is a diagram schematically illustrating a method of determining a query.

The second query creation unit 15 may perform the query creation as described above on the basis of an automaton calculation model as illustrated in FIG. 3, for example. In the example illustrated in FIG. 3, when the number of goals is first set as an evaluation index (evaluation index for a today's result) by the first query creation unit 13, and the first answer to the first query is a good evaluation result (the number of goals is equal to or larger than one), the second query creation unit 15 creates a query for asking for how was the number of goals that is the same evaluation index in the past (previous match). On the other hand, when the first answer to the first query is a bad evaluation result (no goal), the second query creation unit 15 may create a query for asking for whether or not a player was a starting lineup that is an evaluation index of a lower degree of activity than in the past (previous match). As illustrated in FIG. 3, the second query creation unit 15 may also create a query for asking for the same number of goals as the evaluation index for a today's result when a good evaluation that the player was a starting lineup in the previous match is obtained as the second answer. A query creation process using the automaton may be replaced with machine learning.

The second answer derivation unit 16 derives the second answer to the second query on the basis of the information indicating the situation. More specifically, the second answer derivation unit 16 derives the second answer to the second query on the basis of the information indicating the past situation. When the second answer derivation unit 16 receives the input of the second query from the second query creation unit 15, the second answer derivation unit 16 refers to the situation DB 12 and derives the second answer to the second query on the basis of situation data that is the information indicating the situation. Now, it is assumed that, for example, a query for asking for the number of goals in the previous match of player A (Query (player=A, goal=?, time=past)) is input as a query for asking for the condition of player A from the second query creation unit 15. In this case, the second answer derivation unit 16 specifies the number of goals (two goals) of player A in the past (previous match) on the basis of the situation data 121 illustrated in FIG. 2, for example, and derives the second answer "two goals are scored". The second answer derivation unit 16 outputs the derived second answer to the response sentence creation unit 17.

The response sentence creation unit 17 combines the first answer with the second answer to create a response sentence. For example, when "three goals are scored" is derived as the first answer for a today's match and "two goals are scored" is derived as the second answer for a previous match, the response sentence creation unit 17 combines these to create a response sentence "Player A has scored three goals today and has scored two goals in the previous match." The response sentence creation unit 17 outputs the created response sentence to the user terminal 80.

Next, an example in which the situation data illustrated in FIGS. 4(a) to 4(d) are used in the response sentence creation in the response sentence creation device 10 described above will be described. FIGS. 4(a) to 4(d) are diagrams illustrating configuration examples of the situation data.

Figure 4:
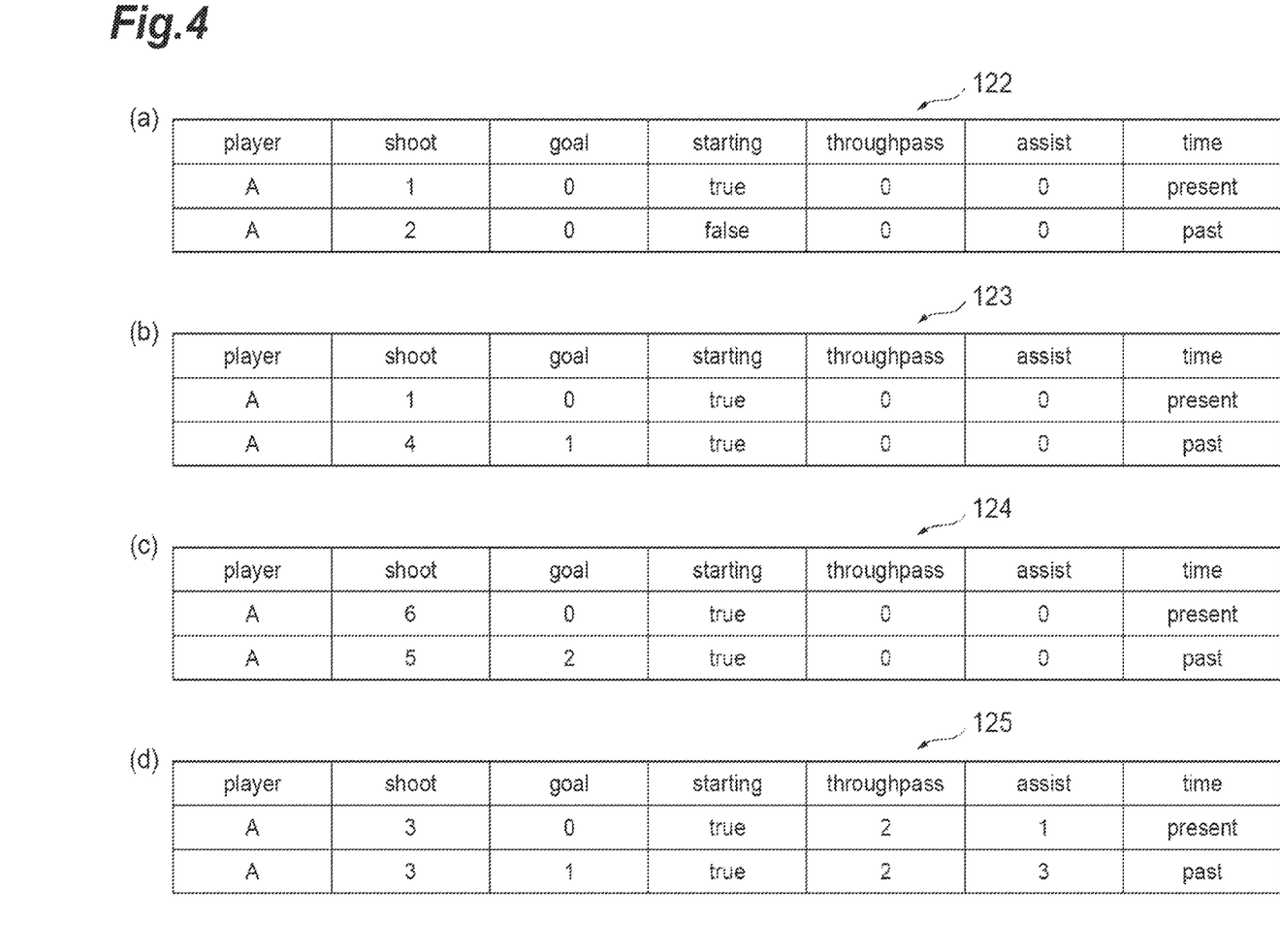
FIG. 4 is a diagram illustrating a configuration example of situation data.

Situation data 122 illustrated in FIG. 4(a) shows that player A was not a starting lineup in a previous match as advance information, and shows that player A did not score a goal in a today's match as real-time information. In this case, it is assumed that words "How about player A recently?" are indicated in the trigger information on the basis of the utterance of the user. The first query creation unit 13 specifies that the trigger information does not include the words related to the predetermined action and that player A is FW, and creates a first query (Query (player=A, goal=?, time=present)) for asking for the number of goals of player A today. The first answer derivation unit 14 refers to the situation data 122 illustrated in FIG. 4(a), and derives an answer "a goal is not scored" as the first answer to the first query. The second query creation unit 15 determines that the first answer was a bad evaluation result (player A is not active today), and creates a query (Query (player=A, starting=?)) for asking for whether or not player A was a starting lineup having an evaluation index of a lower degree of activity than that in a previous match. The second answer derivation unit 16 refers to the situation data 122 illustrated in FIG. 4(a), and derives an answer "A player is not a starting lineup" as the second answer to the second query. The response sentence creation unit 17 combines the first answer with the second answer to create a response sentence that "Player A did not score a goal today and is not a starting lineup in a previous match", and output the response sentence to the user terminal 80.

Situation data 123 illustrated in FIG. 4(b) shows that player A was a starting lineup in a previous match as advance information, and shows that player A has not scored a goal in a today's match as real-time information. In this case, it is assumed that the words "How about player A recently?" are indicated in the trigger information on the basis of the utterance of the user. The first query creation unit 13 specifies that the trigger information does not include the words related to the predetermined action and that player A is FW, and creates a first query (Query (player=A, goal=?, time=present)) for asking for the number of goals of player A today. The first answer derivation unit 14 refers to the situation data 123 illustrated in FIG. 4(b), and derives an answer "the goal has not been scored" as the first answer to the first query. The second query creation unit 15 determines that the first answer was a bad evaluation result (player A is not active today), and create a query (Query (player=A, starting=?)) for asking for whether or not player A was a starting lineup having an evaluation index of a lower degree of activity than that in a previous match. The second answer derivation unit 16 refers to the situation data 123 illustrated in FIG. 4(b) and derives an answer "Player A was a starting lineup" as the second answer to the second query. Further, the second query creation unit 15 determines that the second answer is a good evaluation result and creates the second query (Query (player=A, goal=?, time=past)) asking for the number of goals that is an evaluation index of a higher degree of activity than that in the previous match. That is, the second query creation unit 15 creates a third question together with the first query creation unit 13. The second answer derivation unit 16 refers to the situation data 123 illustrated in FIG. 4(b), and derive an answer "one goal has been scored" as the second answer (second second-answer) to the second query. The response sentence creation unit 17 combines the first answer with the two second answers to create a response sentence "Player A has not scored a goal today, but participated in a starting lineup and scored a goal in a previous match", and output the response sentence to the user terminal 80.

Situation data 124 illustrated in FIG. 4(c) shows that player A had five shoots and two goals in a previous match as advance information and shows player A had six shoots and 0 goal in a today's match as real-time information. In this case, it is assumed that words "Player A missed the shoot again!" is indicated in the trigger information on the basis of the user's utterance. The first query creation unit 13 specifies that the trigger information includes words (shoot) related to the predetermined action, and determines a decision rate that is an index corresponding to the shoot, as an evaluation index. The first query creation unit 13 creates a first query (Query (player=A, goal=?, shoot=?, time=present)) for asking for today's decision rate of player A. The first answer derivation unit 14 refers to the situation data 124 illustrated in FIG. 4(c), and derives an answer "six shoots and no goals" as the first answer to the first query. The second query creation unit 15 determines that the first answer was a bad evaluation result (player A is not active today), and creates a query (Query (player=A, goal=?, shoot=?, time=past)) for asking for a decision rate that is the same evaluation index in the previous match. The second answer derivation unit 16 refers to the situation data 124 illustrated in FIG. 4(c), and derives the answer "five shoots and two goals" as the second answer to the second query. The response sentence creation unit 17 combines the first answer with the second answer to create a response sentence "Player A has six shoots and no goals today, but five shoots and two goals in a previous match." and output the response sentence to the user terminal 80.

The situation data 125 illustrated in FIG. 4(d) shows that player A has three assists in a previous match as advance information, and shows that player A has two through-passes in a today's match as real-time information. An example in which, in a process regarding FIG. 4(d), the acquisition unit 11 acquires the trigger information from information indicating a situation that is not the utterance of the user (information on a real-time action) will be described. In this case, the acquisition unit 11 refers to the situation data 125 illustrated in FIG. 4(d) to specify "Player a through-pass" as information on a real-time action, and acquires the information as the trigger information. The first query creation unit 13 specifies that the trigger information includes the word (through-pass) related to the predetermined action, and determines the number of through-passes as an evaluation index. The first query creation unit 13 creates a first query (Query (player=A, through-pass=?, time=present)) for asking for the number of through-passes of player A today. The first answer derivation unit 14 refers to the situation data 125 illustrated in FIG. 4(d) and derives an answer "two through-paths" as the first answer to the first query. The second query creation unit 15 determines that the first answer was a good evaluation result (player A was active today), and creates a second query (Query (player=A, assist=?, time=past)) for asking for the number of assists that is an evaluation index of a higher degree of activity than that in the previous match. The second answer derivation unit 16 refers to the situation data illustrated in FIG. 4(d), and derives an answer "three assists" as the second answer to the second query. The response sentence creation unit 17 combines the first answer with the second answer to create a response sentence "Player A has decided three assists in a previous match and has two through-passes today.", and output the response sentence to the user terminal 80.

Figure 5:
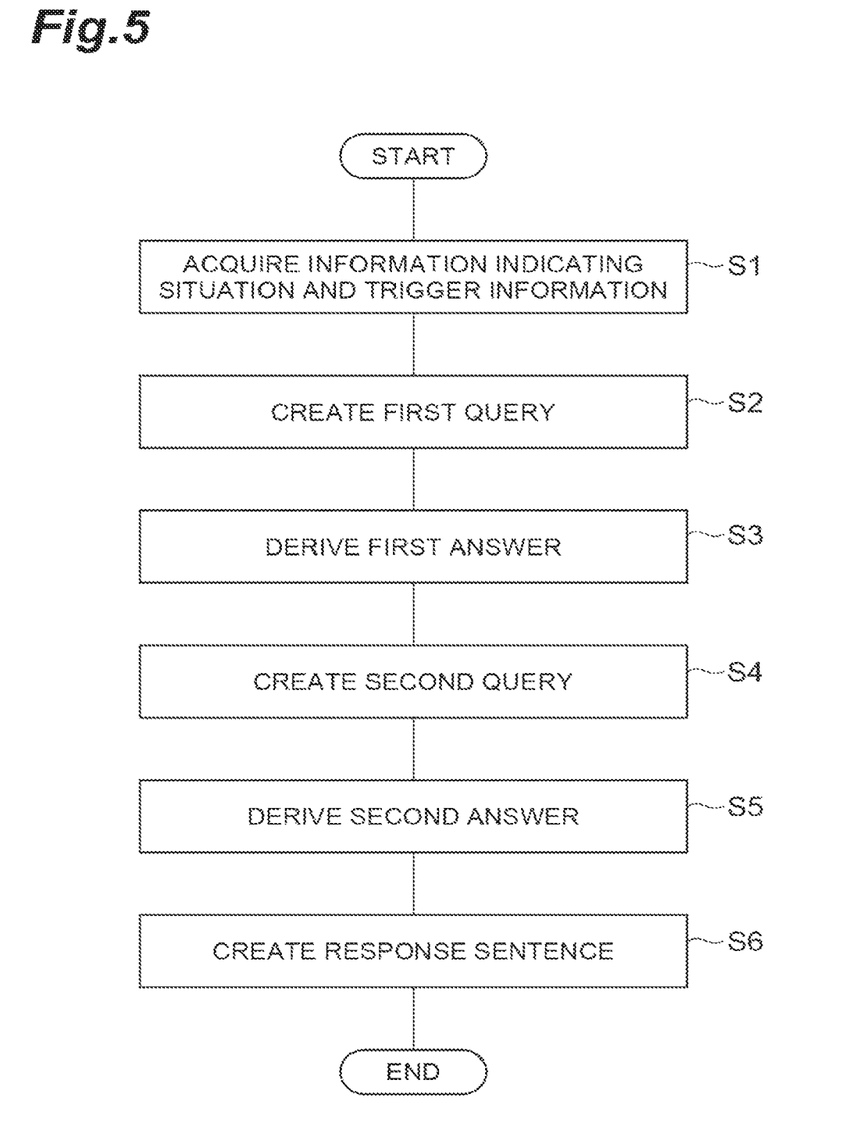
FIG. 5 is a flowchart illustrating a process that is executed by the response sentence creation device according to the embodiment.

Next, a process that is executed by the response sentence creation device 10 will be described with reference to FIG. 5. FIG. 5 is a flowchart illustrating a response sentence creation process that is executed by the response sentence creation device 10 according to the present embodiment.

As illustrated in FIG. 5, in the response sentence creation process, first, information indicating the situation and the trigger information are acquired (step S1). Specifically, the acquisition unit 11 acquires the information indicating the situation (information indicating a situation of a soccer match) from the external DB 50 continuously at predetermined time intervals. The acquisition unit 11 acquires both information indicating a past situation (information on the soccer match that has already ended) and information indicating a present situation (information on a soccer match that is being played in real time). Further, the acquisition unit 11 acquires the trigger information from the user's utterance. Alternatively, the acquisition unit 11 may acquire the trigger information from the information indicating the situation that is not the utterance of the user (the information on the real-time action).

Subsequently, the first query is created (step S2). Specifically, the first query creation unit 13 creates the first answer for deriving the first answer on the basis of the trigger information. Subsequently, the first answer is derived (step S3). Specifically, the first answer derivation unit 14 derives the first answer to the first query on the basis of the information indicating the situation.

Subsequently, the second query is created (step S4). Specifically, the second query creation unit 15 creates the second query for deriving the second answer on the basis of the first answer. Subsequently, the second answer is derived (step S5). Specifically, the second answer derivation unit 16 derives the second answer to the second query on the basis of the information indicating the situation. Finally, the response sentence is created (step S6). Specifically, the response sentence creation unit 17 combines the first answer with the second answer to create a response sentence.

Next, an operation and effect of the response sentence creation device 10 will be described.

The response sentence creation device 10 is a response sentence creation device for creating a query depending on a situation and creating a response sentence for the query and includes the acquisition unit 11 configured to acquire the information indicating the situation and the trigger information serving as a trigger of start of the response sentence creation, the first query creation unit 13 configured to create the first query for deriving the first answer on the basis of the trigger information, the first answer derivation unit 14 configured to derive the first answer to the first query on the basis of the information indicating the situation, the second query creation unit 15 configured to creates the second query for deriving the second answer on the basis of the first answer, the second answer derivation unit 16 configured to derive the second answer to the second query on the basis of the information indicating the situation; and the response sentence creation unit 17 configured to combine the first answer with the second answer to create the response sentence. In the response sentence creation device 10 according to the aspect of the present invention, the first answer to the first query and the second answer to the second query are derived on the basis of the acquired information indicating the situation and combined for creation of the response sentence. Thus, the first answer and the second answer are created depending on the situation and are combined for creation of the response sentence, such that a more appropriate response sentence (non-monotonous response sentence) depending on the situation can be created as compared with a case in which a response sentence is created from a dialogue scenario (fixed phrase) prepared in advance, for example. Further, in the response sentence creation device 10, the second query for deriving the second answer is created on the basis of the first answer to the first query. Accordingly, a new query (second query) is dynamically created according to the answer (first answer) derived in consideration of the situation, an answer (second answer) is derived, and a response sentence is created from the first answer and the second answer. Thus, a new query is created from the answer derived in consideration of the situation and an additional answer is derived and thus, a response sentences obtained from these answers become more appropriate for the situation. As described above, when the answers can be acquired from the respective queries, the response sentence is easily created simply by combining these answers and thus, for example, it is possible to greatly reduce a cost as compared with a case in which a large number of dialogue scenarios (fixed phrases) are prepared. From the above, according to the response sentence creation device 10, it is possible to create an appropriate response sentence depending on various situations while curbing costs. Further, since the response sentence is easily created, a technical effect of reduction of a processing load in a processing unit such as the CPU is also achieved.

The acquisition unit 11 acquires the information indicating the present situation as the information indicating the situation. This makes it possible to create a response sentence in consideration of the present situation, and to flexibly create a response sentence for a situation that changes in real time.

The acquisition unit 11 further acquires the information indicating the past situation as the information indicating the situation. This makes it possible to create a response sentence in consideration of not only the present situation but also the past situation, and to create a more appropriate response sentence depending on the situation.

The first query creation unit 13 creates a first query for deriving the first answer related to the present situation on the basis of the trigger information, the first answer derivation unit 14 derives the first answer to the first query on the basis of the information indicating the present situation, the second query creation unit 15 creates the second query for deriving the second answer related to the past situation on the basis of the first answer, and the second answer derivation unit 16 derives the second answer to the second query on the basis of the information indicating the past situation. Accordingly, the first answer is derived and the second query related to the first answer is created on the basis of the present situation, and the second answer to the second query is derived on the basis of the past situation. Thus, an answer based on the present situation (first answer) and an answer based on the past situation (second answer) are obtained for related content such that a further appropriate response sentence depending on the situation can be created.

The acquisition unit 11 acquires the trigger information from the user's utterance. This makes it possible to more preferably create the response sentence requested by the user. Further, the acquisition unit 11 may acquire the trigger information from the information indicating the situation. This makes it possible to create a response sentence depending on the situation even when there is no input (utterance or the like) from the user.

Figure 6:
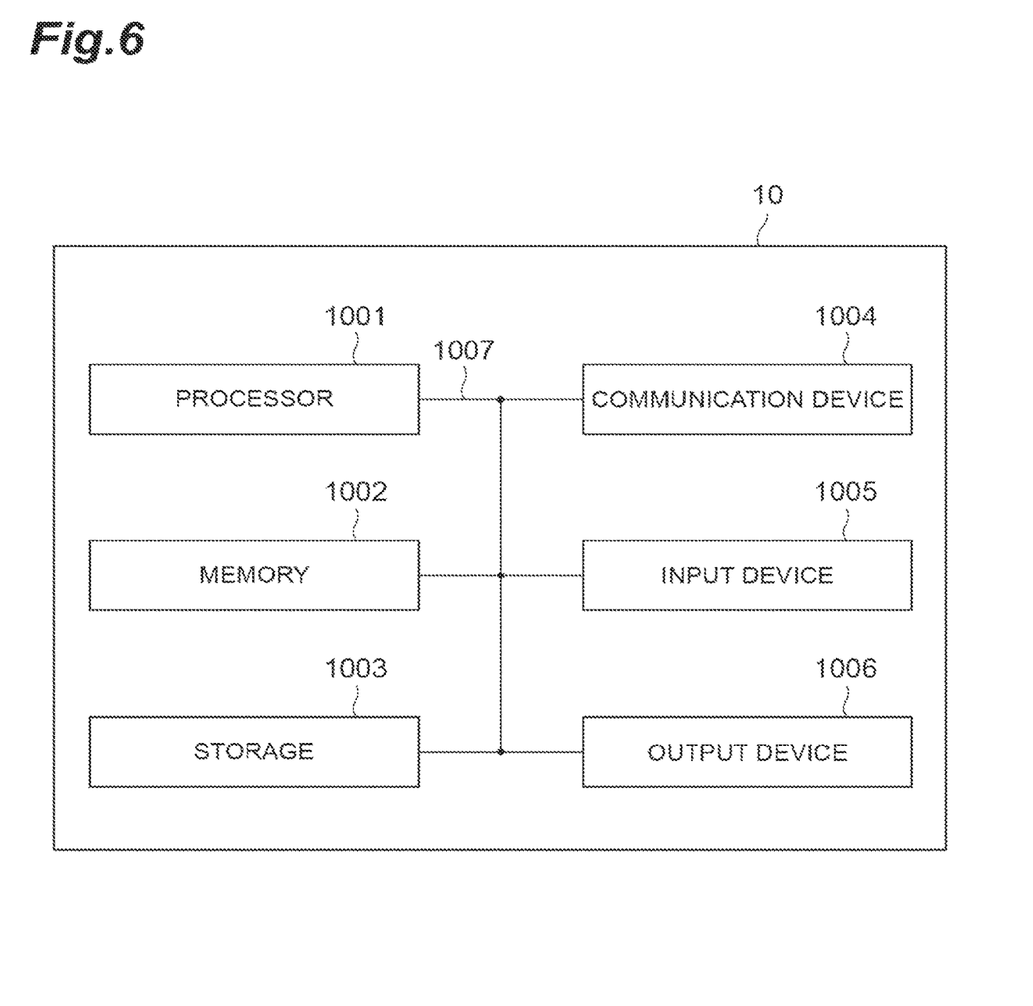
FIG. 6 is a diagram illustrating a hardware configuration of the response sentence creation device according to the embodiment.

Finally, a hardware configuration of the response sentence creation device 10 will be described with reference to FIG. 6. The response sentence creation device 10 described above may be physically configured as a computer device including a processor 1001, a memory 1002, a storage 1003, a communication device 1004, an input device 1005, an output device 1006, a bus 1007, and the like.

In the following description, the term "device" can be read as a circuit, a device, a unit, or the like. The hardware configuration of the response sentence creation device 10 may be configured to include one or a plurality of illustrated devices or may be configured without including some of the devices.

Each function in the response sentence creation device 10 is realized by loading predetermined software (a program) into hardware such as the processor 1001 or the memory 1002 so that the processor 1001 performs calculation to control communication that is performed by the communication device 1004 or reading and/or writing of data in the memory 1002 and the storage 1003.

The processor 1001, for example, operates an operating system to control the entire computer. The processor 1001 may be configured as a central processing unit (CPU) including an interface with a peripheral device, a control device, a calculation device, a register, and the like. For example, a control function of the acquisition unit 11 or the like of the response sentence creation device 10 may be realized by the processor 1001.

Further, the processor 1001 loads a program (program code), a software module, or data from the storage 1003 and/or the communication device 1004 into the memory 1002 and executes various processes according to the program, the software module, or the data. As the program, a program for causing the computer to execute at least part of the operation described in the above embodiment may be used. For example, the control function of the acquisition unit 11 or the like of the response sentence creation device 10 may be realized by a control program stored in the memory 1002 and operating on the processor 1001, or other functional blocks may be realized similarly. Although the case in which the various processes described above are executed by one processor 1001 has been described, the processes may be executed simultaneously or sequentially by two or more processors 1001. The processor 1001 may be implemented by one or more chips. The program may be transmitted from a network via an electric communication line.

The memory 1002 is a computer-readable recording medium and may be configured of, for example, at least one of a read only memory (ROM), an erasable programmable ROM (EPROM), an electrically erasable programmable ROM (EEPROM), and a random access memory (RANI). The memory 1002 may be referred to as a register, a cache, a main memory (a main storage device), or the like. The memory 1002 can store an executable program (program code), software modules, and the like in order to implement a wireless communication method according to the embodiment of the present invention.

The storage 1003 is a computer-readable recording medium and may be configured of, for example, at least one of an optical disc such as a compact disc ROM (CD-ROM), a hard disk drive, a flexible disc, a magneto-optical disc (for example, a compact disc, a digital versatile disc, or a Blu-ray (registered trademark) disc), a smart card, a flash memory (for example, a card, a stick, or a key drive), a floppy (registered trademark) disk, a magnetic strip, and the like. The storage 1003 may be referred to as an auxiliary storage device. The storage medium described above may be, for example, a database including the memory 1002 and/or the storage 1003, a server, or another appropriate medium.

The communication device 1004 is hardware (a transmission and reception device) for performing communication between computers via a wired and/or wireless network and is also referred to as a network device, a network controller, a network card, or a communication module, for example.

The input device 1005 is an input device (for example, a keyboard, a mouse, a microphone, a switch, a button, or a sensor) that receives an input from the outside. The output device 1006 is an output device (for example, a display, a speaker, or an LED lamp) that performs output to the outside. The input device 1005 and the output device 1006 may have an integrated configuration (for example, a touch panel).

Further, the respective devices such as the processor 1001 and the memory 1002 are connected by the bus 1007 for information communication. The bus 1007 may be configured as a single bus or may be configured as different buses between the devices.

Further, the response sentence creation device 10 may include hardware such as a microprocessor, a digital signal processor (DSP), an application specific integrated circuit (ASIC), a programmable logic device (PLD), or a field programmable gate array (FPGA), and some or all of the functional blocks may be realized by the hardware. For example, the processor 1001 may be implemented by at least one of these pieces of hardware.

Although the present invention has been described in detail above, it is apparent to those skilled in the art that the embodiment is not limited to the embodiment described in the present specification. The embodiment can be implemented as a modified and changed aspect without departing from the spirit and scope of the present invention defined by the description of the claims. Accordingly, the description of the present specification is intended for the purpose of illustration and does not have any restrictive meaning with respect to the embodiment. For example, the example in which both the present information and the information indicating the past situation are acquired as the information indicating the situation has been described, but the present invention is not limited thereto, and only one of these may be acquired and used for creation of the response sentence.

Further, each aspect/embodiment described in the present specification may be applied to long term evolution (LTE), LTE advanced (LTE-A), SUPER 3G, IMT-Advanced, 4G, 5G, future radio access (FRA), W-CDMA (registered trademark), GSM (registered trademark), CDMA2000, Ultra Mobile Broadband (UMB), IEEE 802.11 (Wi-Fi), IEEE 802.16 (WiMAX), IEEE 802.20, ultra wide band (UWB), Bluetooth (registered trademark), a system using another appropriate system, and/or a next generation system extended on the basis of these systems.

A process procedure, a sequence, a flowchart, and the like in each aspect/embodiment described in the present specification may be in a different order unless inconsistency arises. For example, for the method described in the present specification, elements of various steps are presented in an exemplary order, and the elements are not limited to the presented specific order.

Input or output information or the like may be stored in a specific place (for example, a memory) or may be managed in a management table. Information or the like to be input or output can be overwritten, updated, or additionally written. Output information or the like may be deleted. Input information or the like may be transmitted to another device.

A determination may be performed using a value (0 or 1) represented by one bit, may be performed using a Boolean value (true or false), or may be performed through a numerical value comparison (for example, comparison with a predetermined value).

Each aspect/embodiment described in the present specification may be used alone, may be used in combination, or may be used by being switched according to the execution. Further, a notification of predetermined information (for example, a notification of "being X") is not limited to being made explicitly, and may be made implicitly (for example, a notification of the predetermined information is not made).

Software should be construed widely so that the software means an instruction, an instruction set, a code, a code segment, a program code, a program, a sub-program, a software module, an application, a software application, a software package, a routine, a sub-routine, an object, an executable file, a thread of execution, a procedure, a function, and the like regardless of whether the software may be called software, firmware, middleware, microcode, or hardware description language or called another name.

Further, software, instructions, and the like may be transmitted and received via a transmission medium. For example, when software is transmitted from a website, a server, or another remote source using wired technology such as a coaxial cable, an optical fiber cable, a twisted pair and a digital subscriber line (DSL) and/or wireless technology such as infrared rays, radio, and microwaves, the wired technology and/or wireless technology are included in the definition of the transmission medium.

The information, signals, and the like described in the present specification may be represented by any of various different technologies. For example, data, an instruction, a command, information, a signal, a bit, a symbol, a chip, and the like that can be referred to throughout the above description may be represented by a voltage, a current, an electromagnetic wave, a magnetic field or a magnetic particle, an optical field or a photon, or an arbitrary combination of these.

The terms described in the present specification and/or terms necessary for understanding of the present specification may be replaced by terms having the same or similar meanings.

Further, information, parameters, and the like described in the present specification may be represented by an absolute value, may be represented by a relative value from a predetermined value, or may be represented by corresponding different information.

A user terminal may be called a mobile communication terminal, a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or some other suitable terms by a person of ordinary skill in the art.

The term "determining" used in the present specification may include a variety of operations. The "determining" can include, for example, regarding calculating, computing, processing, deriving, investigating, looking up (for example, looking up in a table, a database or another data structure), or ascertaining as "determining". Further, "determining" can include, for example, regarding receiving (for example, receiving information), transmitting (for example, transmitting information), inputting, outputting, or accessing (for example, accessing data in a memory) as "determining". Further, "determining" can include regarding resolving, selecting, choosing, establishing, comparing or the like as "determining". That is, "determining" can include regarding a certain operation as "determining".

The description "based on" used in the present specification does not mean "based only on" unless otherwise noted. In other words, the description "based on" means both of "based only on" and "at least based on".

When terms such as "first" and "second" have been used in the present specification, any reference to elements thereof does not generally limit an amount or order of the elements. These terms can be used in the present specification as a convenient way to distinguish between two or more elements. Thus, the reference to the first and second elements does not mean that only two elements can be adopted there or that the first element has to precede the second element in some way.

As long as "include", "including" and variations thereof are used in the present specification or claims, those terms are intended to be comprehensive like the term "comprising". Further, the term "or" used in the present specification or claims is intended not to be an exclusive OR.

In the present specification, it is assumed that a plurality of devices are included unless a single device is clearly indicated by the context or technically.

In the whole of the present disclosure, it is assumed that a plurality of ones are included as long as the context does not clearly indicate a single one.

REFERENCE SIGNS LIST

10: Response sentence creation device
11: Acquisition unit
13: First query creation unit
14: First answer derivation unit
15: Second query creation unit
16: Second answer derivation unit
17: Response sentence creation unit

The invention claimed is:

1. A response sentence creation device for creating a query depending on a situation and creating a response sentence for the query, the response sentence creation device comprising:
processing circuitry configured to
acquire information indicating a situation and trigger information serving as a trigger of start of response sentence creation;
create a first query for deriving a first answer to the first query on the basis of the trigger information;
derive the first answer to the first query on the basis of the information indicating the situation;
create a second query for deriving a second answer to the second query on the basis of the first answer;
derive the second answer to the second query on the basis of the information indicating the situation; and
combine the first answer to the first query with the second answer to the second query to create a response sentence.

2. The response sentence creation device according to claim 1, wherein the processing circuitry acquires information indicating a present situation as the information indicating the situation.

3. The response sentence creation device according to claim 1, wherein the processing circuitry further acquires information indicating a past situation as the information indicating the situation.

4. The response sentence creation device according to claim 1,
wherein the processing circuitry
acquires both information indicating a present situation and information indicating a past situation as the information indicating the situation,
creates the first query for deriving the first answer to the first query to be related to the present situation on the basis of the trigger information,
derives the first answer to the first query on the basis of the information indicating the present situation,
creates the second query for deriving the second answer to the second query to be related to the past situation on the basis of the first answer to the first query, and
derives the second answer to the second query on the basis of the information indicating the past situation.

5. The response sentence creation device according to claim 1, wherein the processing circuitry acquires the trigger information from a user's utterance.

6. The response sentence creation device according to claim 1, wherein the processing circuitry acquires the trigger information from the information indicating the situation.

7. A method implemented by processing circuitry of a response sentence creation device for creating a query depending on a situation and creating a response sentence for the query, the method comprising:
acquiring information indicating a situation and trigger information serving as a trigger of start of response sentence creation;
creating a first query for deriving a first answer to the first query on the basis of the trigger information;
deriving the first answer to the first query on the basis of the information indicating the situation;
creating a second query for deriving a second answer to the second query on the basis of the first answer;
deriving the second answer to the second query on the basis of the information indicating the situation; and
combining the first answer to the first query with the second answer to the second query to create a response sentence.

* * * * *